(12) United States Patent  (10) Patent No.: US 6,702,065 B2
Ehnes  (45) Date of Patent: Mar. 9, 2004

(54) FOLDED TIRE STEP AND WHEELED CADDY APPARATUS

(76) Inventor: Steve L. Ehnes, P.O. Box 1357, Lebanon, MO (US) 65536

( * ) Notice: Subject to any disclaimer, the term of this patent is extended or adjusted under 35 U.S.C. 154(b) by 298 days.

(21) Appl. No.: 09/877,601

(22) Filed: Jun. 9, 2001

(65) Prior Publication Data

US 2001/0025740 A1 Oct. 4, 2001

Related U.S. Application Data

(63) Continuation-in-part of application No. 09/656,410, filed on Sep. 6, 2000, now Pat. No. 6,457,558, which is a continuation-in-part of application No. 09/528,532, filed on Mar. 20, 2000, now abandoned.

(51) Int. Cl.[7] .............................. E04G 3/10; E06C 5/00; B25H 5/00
(52) U.S. Cl. ...................... 182/150; 182/127; 280/32.6; 280/30
(58) Field of Search ..................... 182/12, 88, 17.15, 182/115, 129, 127, 150, 90, 91, 93; 280/165, 163, 166, 32.5, 32.6, 79.11, 79.4, 47.25, 30; 297/DIG. 6, 188.01; D6/336

(56) References Cited

U.S. PATENT DOCUMENTS

| 1,104,398 | A | * | 7/1914 | Zimmerman | 280/32.6 |
| 2,701,168 | A | * | 2/1955 | Schemere | 182/116 |
| D276,861 | S | * | 12/1984 | Keddie | D6/336 |
| 4,832,355 | A | * | 5/1989 | Hung | 280/32.5 |
| 5,072,955 | A | * | 12/1991 | Holland et al. | 280/32.5 |
| 5,088,747 | A | * | 2/1992 | Morrison et al. | 297/DIG. 6 |
| 5,195,763 | A | * | 3/1993 | Scott et al. | 280/32.6 |
| 5,255,757 | A | * | 10/1993 | Horowitz et al. | 182/127 |
| 5,599,031 | A | * | 2/1997 | Do Rosario Sousa De Cabedo | 280/30 |
| 5,613,257 | A | * | 3/1997 | Graebe | 297/DIG. 6 |
| 5,669,463 | A | * | 9/1997 | Robertson | 182/115 X |
| RE35,732 | E | * | 2/1998 | Shockley | 280/32.6 |
| 6,010,187 | A | * | 1/2000 | Dallas et al. | 280/32.5 X |
| 6,095,532 | A | * | 8/2000 | Martin | 280/32.6 |
| 6,105,719 | A | * | 8/2000 | Lensing | 280/32.5 X |
| 6,199,877 | B1 | * | 3/2001 | Shockley | 280/32.6 |
| RE37,372 | E | * | 9/2001 | Smith | 280/32.6 |
| 6,378,720 | B1 | * | 4/2002 | Santa Cruz et al. | 182/91 X |

* cited by examiner

Primary Examiner—Alvin Chin-Shue
Assistant Examiner—Hugh B. Thompson

(57) ABSTRACT

A folded tire step and wheeled caddy apparatus includes a folded up tire step unit and a wheeled caddy unit which includes step-unit supports, step-unit translation preventers, and step-unit connectors. The folded up tire step unit includes bottom ends of a front bracket portion and bottom ends of a rear bracket portion. The wheeled caddy unit includes a caddy floor portion, and the step-unit supports include elevated platforms which extend upward from the caddy floor portion. The caddy floor portion includes downwardly descending floor portions and a floor drain opening. When a person sits on the folded up tire step unit that is supported by the a wheeled caddy unit, the person can use one's feet to propel the a wheeled caddy unit along a floor surface. A cushion member can be attached to a top portion of the folded up tire step unit.

11 Claims, 4 Drawing Sheets

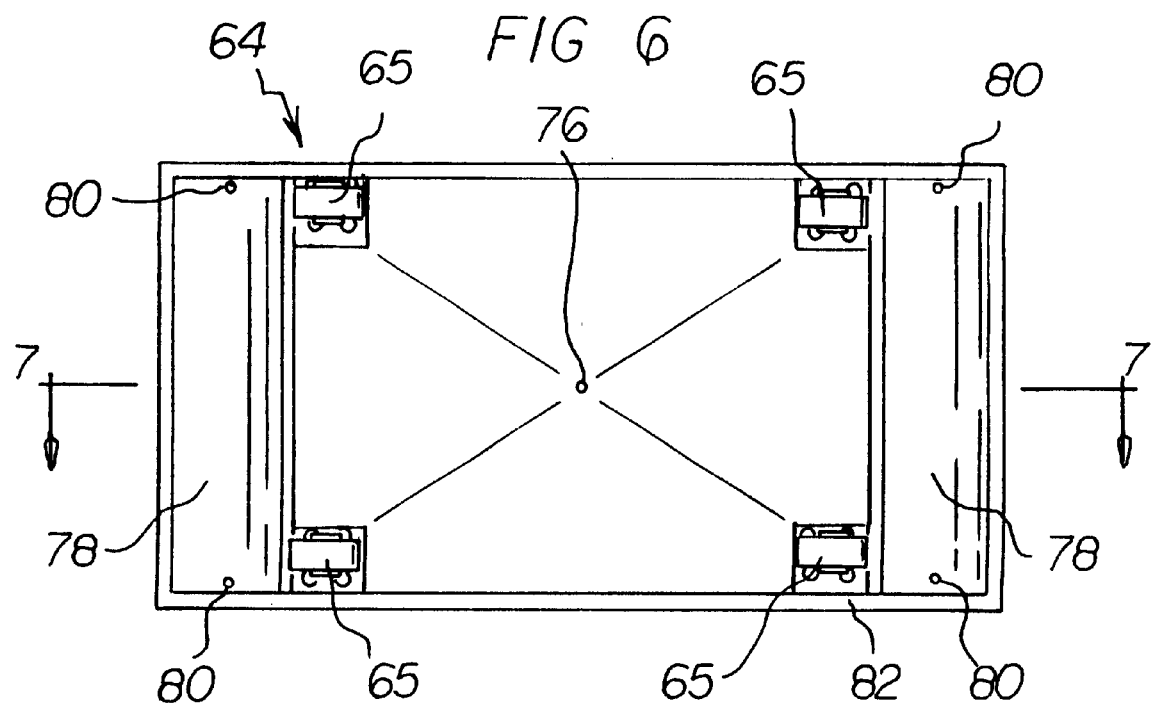
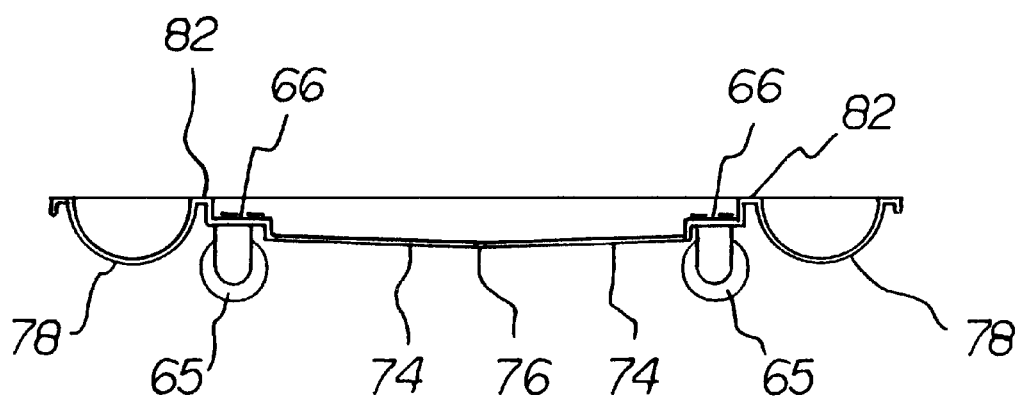

FOLDED TIRE STEP AND WHEELED CADDY APPARATUS

CROSS-REFERENCE TO RELATED APPLICATION

This application is a continuation-in-part of my prior patent application Ser. No. 09/656,410, filed Sep. 6, 2000, now U.S. Pat. No. 6,457,558 which is a continuation-in-part of my prior patent application, Ser. No. 09/528,532, filed Mar. 20, 2000 now abandoned.

BACKGROUND OF THE INVENTION

1. Field of the Invention

The present invention relates generally to a tire step apparatus and to a wheeled caddy and, more particularly, to a combination apparatus made by combining a folded tire step and a wheeled caddy.

2. Description of the Prior Art

In general, tire step apparatuses are well known in the art. However, the present invention relates to particular tire step apparatuses (hereinafter referred to as the present inventor's tire step apparatuses) disclosed in both my above-mentioned co-pending patent application Ser. No. 09/656,410, filed Sep. 6, 2000, and my above-mentioned prior co-pending patent application, Ser. No. 09/528,532, filed Mar. 20, 2000, both of which are incorporated herein by reference.

In general, wheeled caddies that are employed by persons for carrying out maintenance activities on motor vehicles are also well known in the art.

However, with the present invention, a new use is described for the present inventor's tire step apparatuses. When in the folded up condition, such as shown in FIG. 16 of my prior co-pending patent application Ser. No. 09/656, 410, filed Sep. 6, 2000, a folded up tire step apparatus can be combined with a special wheeled caddy to provide a wheeled caddy on which a person can sit upon to carry out maintenance activities.

To combine a folded up tire step apparatus with a special wheeled caddy, it is important that the folded up tire step apparatus and the special wheeled caddy be secured firmly together so that they do not separate from each other.

Moreover, it is important, for the stability of the person using such a folded tire step and wheeled caddy apparatus, that the folded up tire step apparatus not be translated in a sideways manner with respect to the special wheeled caddy.

Still other features would be desirable in a folded tire step and wheeled caddy apparatus. For example, if such an apparatus is used outdoors during a rainy day, water may accumulate in a wheeled caddy. To avoid accumulation of water, it would be desirable if a wheeled caddy were provided with drain holes.

Since there may be times when the folded up tire step apparatus may be removed from the special wheeled caddy to be unfolded and used as a tire step apparatus, it would be desirable if the connections between the folded up tire step portion and the special wheeled caddy portion can be easily made and unmade.

Furthermore, when a folded up tire step apparatus is used as a seat on a special wheeled caddy, it would be desirable to be able to use a cushion as part of the seat. However, since the tire step apparatus may be used for attachment to a tire and a person stepping thereon, it would be desirable if such a seat cushion can be readily attached to or detached from the tire step apparatus.

Thus, while the foregoing discussion indicates it to be well known to use tire step apparatuses and to use wheeled caddies for motor vehicle maintenance, there is no teaching or suggestion of a combined folded tire step and wheeled caddy apparatus which has the following combination of desirable features: (1) provides a folded up tire step apparatus which can be combined with a special wheeled caddy to provide a wheeled caddy on which a person can sit upon to carry out maintenance activities; (2) provides that the folded up tire step apparatus and the special wheeled caddy can be secured firmly together so that they do not separate from each other; (3) provides that the folded up tire step apparatus is not translated in a sideways manner with respect to the special wheeled caddy; (4) provides the wheeled caddy with drain holes; (5) provides connections between the folded up tire step portion and the special wheeled caddy portion which can be easily made and unmade; (6) provides a seat cushion as part of the seat; and (7) provides that the seat cushion can be readily attached to or detached from the tire step apparatus. The foregoing desired characteristics are provided by the unique folded tire step and wheeled caddy apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a folded tire step and wheeled caddy apparatus which includes a folded up tire step unit and a wheeled caddy unit which includes step-unit supports, step-unit translation preventers, and step-unit connectors. The folded up tire step unit includes bottom ends of a front bracket portion and bottom ends of a rear bracket portion. The wheeled caddy unit includes a caddy floor portion, and the step-unit supports include elevated platforms which extend upward from the caddy floor portion. The caddy floor portion includes downwardly descending floor portions and a floor drain opening. When a person sits on the folded up tire step unit, the person can use one's feet to propel the a wheeled caddy unit along a floor surface.

Preferably, the wheeled caddy unit includes utility trays attached to side portions of the caddy floor portion. The utility trays include tray drain openings. The wheeled caddy unit includes translation prevention walls extending upward from peripheral regions of the caddy floor portion, adjacent to the step-unit supports.

Preferably, each of the step-unit connectors includes an elastic strap connected to the caddy floor portion. A hook is connected to the elastic strap.

Preferably, a cushion member is attached to a top portion of the folded up tire step unit. The cushion member can include a quantity of first hook or loop connectors, and the top portion of the folded up tire step unit can include a quantity of complimentary second hook or loop connectors.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved folded tire step and wheeled caddy apparatus which has all of the advantages of the prior art and none of the disadvantages.

It is another object of the present invention to provide a new and improved folded tire step and wheeled caddy apparatus which may be easily and efficiently manufactured and marketed.

It is a further object of the present invention to provide a new and improved folded tire step and wheeled caddy apparatus which is of durable and reliable construction.

An even further object of the present invention is to provide a new and improved folded tire step and wheeled caddy apparatus which is susceptible of a low cost of manufacture with regard to both materials and labor, and which accordingly is then susceptible of low prices of sale to the consuming public, thereby making such folded tire step and wheeled caddy apparatus available to the buying public.

Still yet a further object of the present invention is to provide a new and improved folded tire step and wheeled caddy apparatus which provides a folded up tire step apparatus which can be combined with a special wheeled caddy to provide a wheeled caddy on which a person can sit upon to carry out maintenance activities.

Still another object of the present invention is to provide a new and improved folded tire step and wheeled caddy apparatus that provides that the folded up tire step apparatus and the special wheeled caddy can be secured firmly together so that they do not separate from each other.

Yet another object of the present invention is to provide a new and improved folded tire step and wheeled caddy apparatus which provides that the folded up tire step apparatus is not translated in a sideways manner with respect to the special wheeled caddy.

Even another object of the present invention is to provide a new and improved folded tire step and wheeled caddy apparatus that provides the wheeled caddy with drain holes.

Still a further object of the present invention is to provide a new and improved folded tire step and wheeled caddy apparatus which provides connections between the folded up tire step portion and the special wheeled caddy portion which can be easily made and unmade.

Yet another object of the present invention is to provide a new and improved folded tire step and wheeled caddy apparatus that provides a seat cushion as part of the seat.

Still another object of the present invention is to provide a new and improved folded tire step and wheeled caddy apparatus which provides that the seat cushion can be readily attached to or detached from the tire step apparatus.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 6 is bottom view of the special wheeled caddy portion shown in FIG. 5 taken along line 6—6 thereof, wherein the wheeled caddy unit can be regarded as in a caddy-only arrangement.

FIG. 7 is a cross-sectional view of the embodiment of the invention of FIG. 6 taken along line 7—7 thereof.

DESCRIPTION OF THE PREFERRED EMBODIMENT

With reference to the drawings, a new and improved folded tire step and wheeled caddy apparatus embodying the principles and concepts of the present invention will be described.

Figure 1:
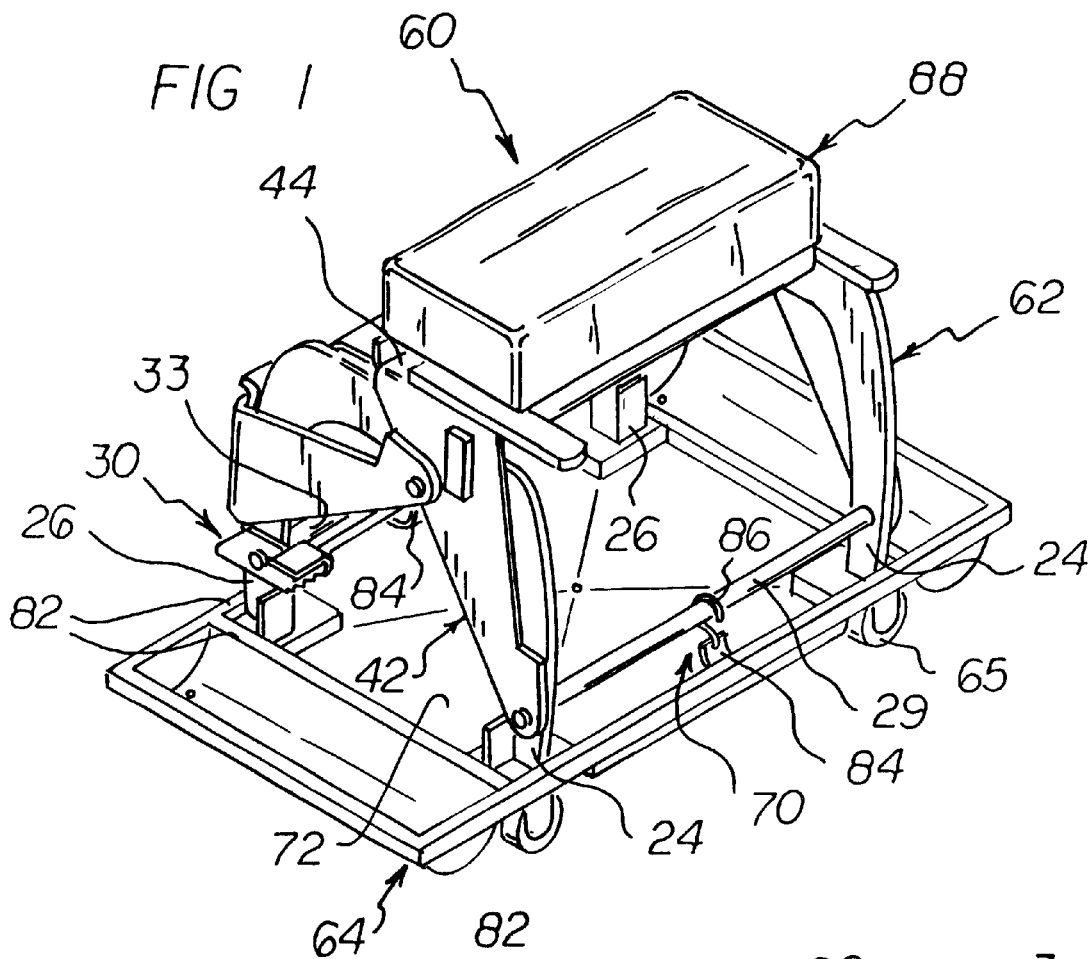
FIG. 1 is a perspective view of the a preferred embodiment of the folded tire step and wheeled caddy apparatus of the invention, wherein the folded up tire step apparatus is secured to the special wheeled caddy so that the apparatus is in a seating arrangement.
Figure 2:
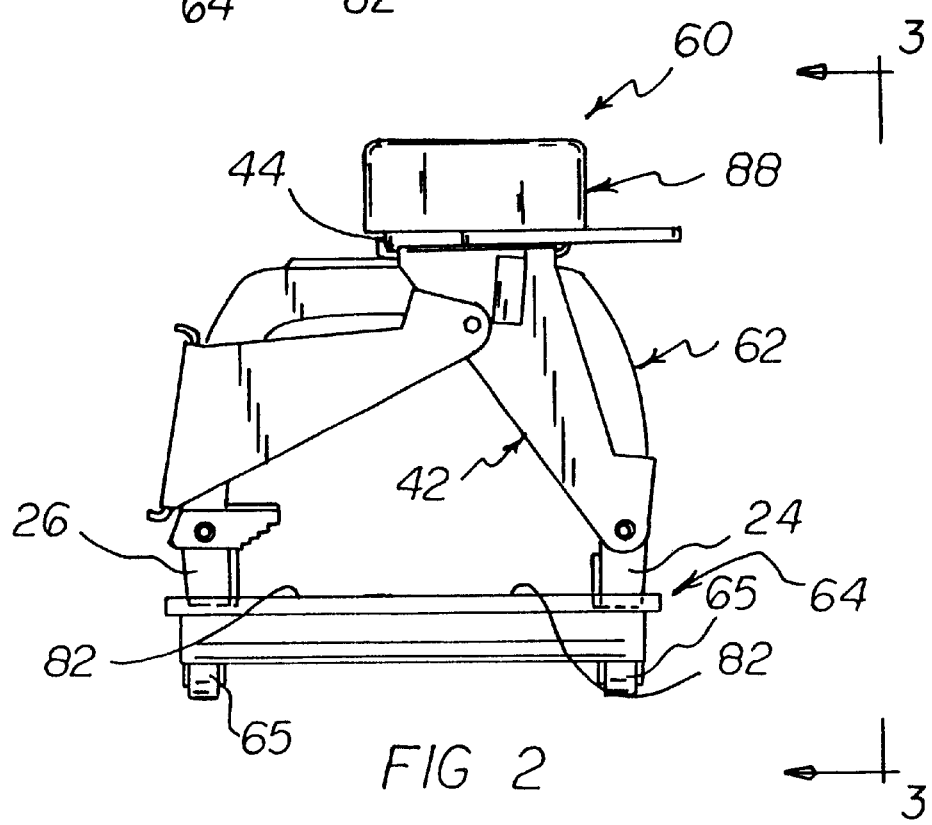
FIG. 2 is a side view of the embodiment of the invention shown in FIG. 1.
Figure 3:
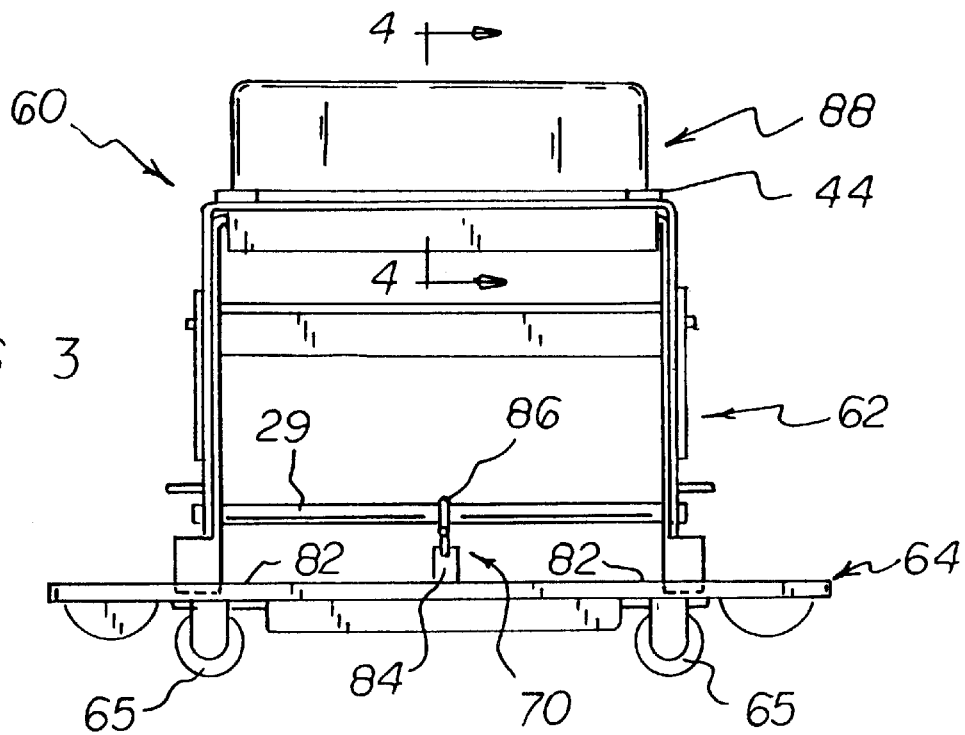
FIG. 3 front view of the embodiment of the invention shown in FIG. 2 taken along line 3—3 thereof.
Figure 4:
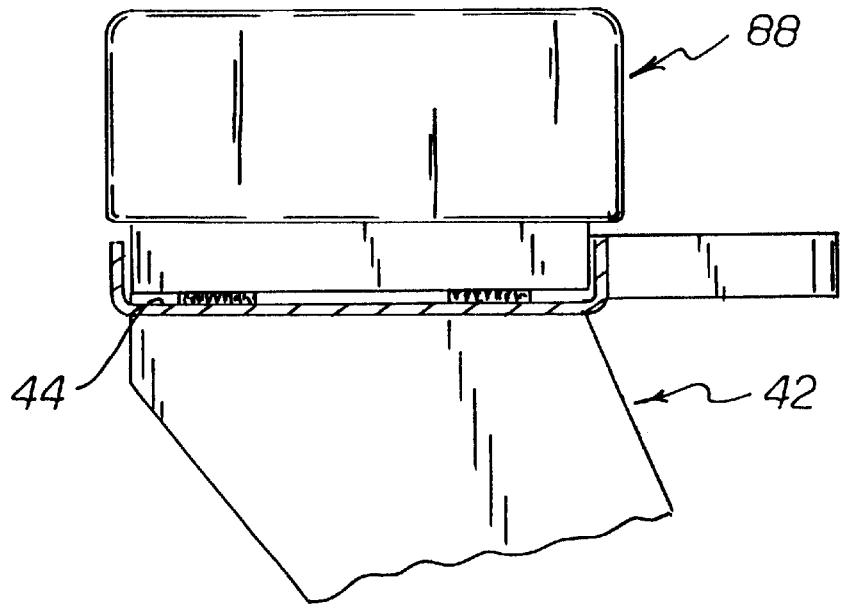
FIG. 4 is an enlarged cross-sectional view of the portion of the embodiment of the invention shown in FIG. 3 taken along line 4—4 thereof.
Figure 5:
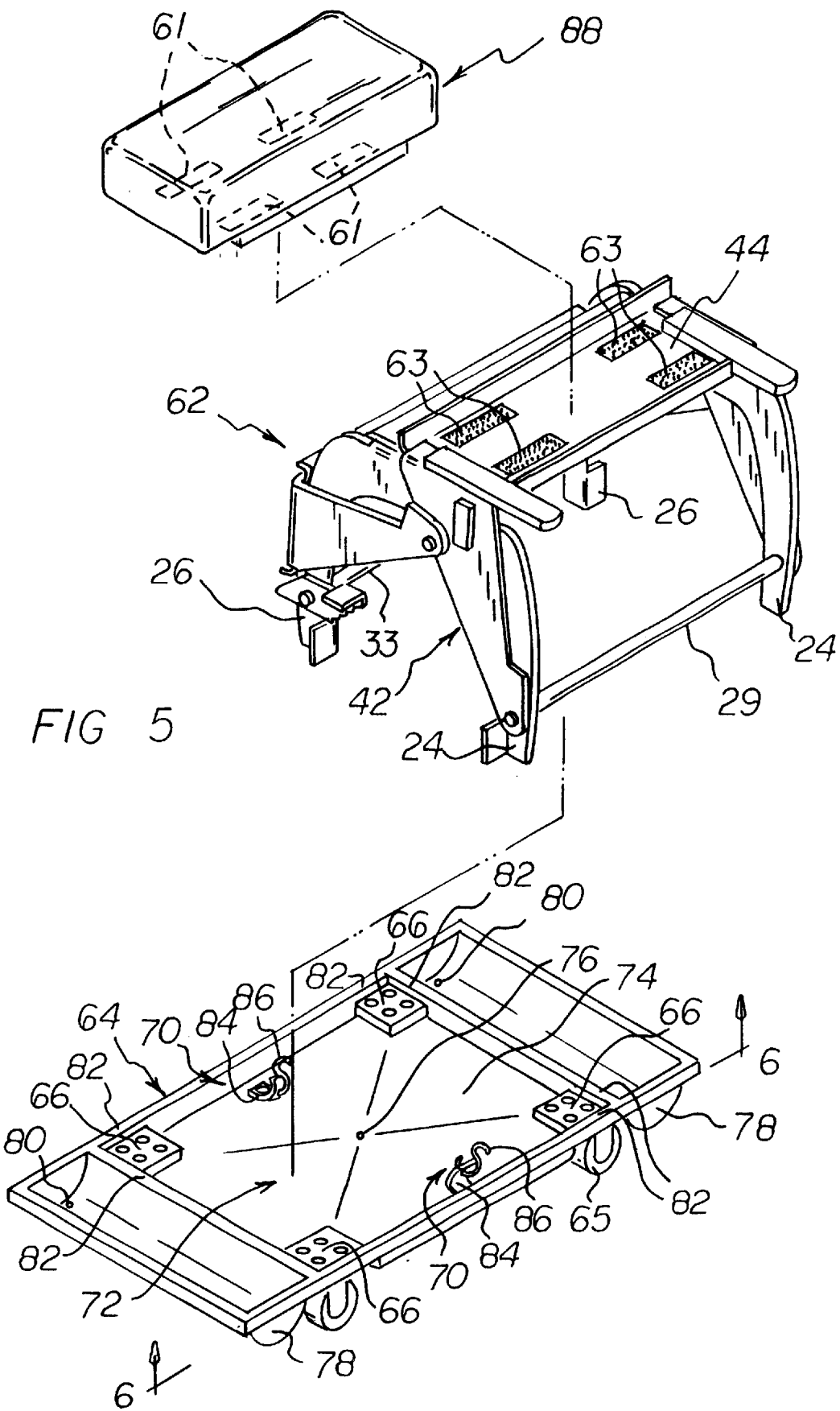
FIG. 5 is a partially exploded perspective view of the embodiment of the invention shown in FIGS. 1–4.

Turning to FIGS. 1–5, there is shown an exemplary embodiment of the folded tire step and wheeled caddy apparatus of the invention generally designated by reference numeral 60. In its preferred form, folded tire step and wheeled caddy apparatus 60 includes a folded up tire step unit 62 and a wheeled caddy unit 64 which includes step-unit supports 66, step-unit translation preventers 68, and step-unit connectors 70. The folded up tire step unit 62 includes bottom ends of a front bracket portion 24 and bottom ends of a rear bracket portion 26. The wheeled caddy unit 64 includes a caddy floor portion 72, and the step-unit supports 66 include elevated platforms 66 which extend upward from the caddy floor portion 72. The caddy floor portion 72 includes downwardly descending floor portions 74 and a floor drain opening 76.

Preferably, the wheeled caddy unit 64 includes utility trays 78 attached to side portions of the caddy floor portion 72. The utility trays 78 include tray drain openings 80. The wheeled caddy unit 64 includes translation prevention walls 82 extending upward from peripheral regions of the caddy floor portion 72, adjacent to the step-unit supports 66.

Preferably, each of the step-unit connectors 70 includes an elastic strap 84 connected to the caddy floor portion 72. A hook 86 is connected to the elastic strap 84.

Preferably, a cushion member 88 is attached to a top portion of the folded up tire step unit 62. The cushion member 88 can include a quantity of first hook or loop connectors 61, and the top portion of the folded up tire step unit 62 can include a quantity of complimentary second hook or loop connectors 63.

To use the folded tire step and wheeled caddy apparatus 60 of the invention in the seating arrangement, a folded up tire step unit 62 is obtained in the folded up condition such as shown in FIGS. 1–3 and 5 herein and in FIG. 16 of my above-mentioned prior co-pending patent application Ser. No. 09/656,410, filed Sep. 6, 2000, incorporated herein by reference. The folded up tire step unit 62 is placed on the wheeled caddy unit 64 so that the bottom ends of a front bracket portion 24 and the bottom ends of a rear bracket portion 26 rest upon the step-unit supports 66. In this arrangement, the translation prevention walls 82 prevent the folded up tire step unit 62 from moving sideways in the wheeled caddy unit 64.

To secure the folded up tire step unit 62 to the wheeled caddy unit 64, the hook 86 of the front step-unit connector 70 is grasped and pulled upward so that it hooks over the hinge axle 29 of the folded up tire step unit 62. Similarly, the hook of the rear step-unit connector 70 is grasped and pulled upward so that it hooks over the pawl axle 33. The elastic straps 84 pull the respective hooks and axles towards the wheeled caddy unit 64. Moreover, the step-unit connectors 70 prevent the folded up tire step unit 62 from being lifted off of the wheeled caddy unit 64. When the folded up tire step unit 62 is lifted upward, both the folded up tire step unit 62 and the wheeled caddy unit 64 are lifted upward as a unified structure.

In using the folded tire step and wheeled caddy apparatus 60 in the seating arrangement, a person simply sits on the cushion member 88. By using one's feet against a floor surface, the person can propel oneself on the floor surface, and the wheeled caddy unit 64 rolls upon its wheels 65.

Another mode of use of the folded tire step and wheeled caddy apparatus 60 is as a caddy-only arrangement such as shown in FIGS. 6 and 7. In the caddy-only arrangement, the folded up tire step unit 62 is removed from the wheeled caddy unit 64. To remove the folded up tire step unit 62 from the wheeled caddy unit 64, the hooks 86 are lifted off of the respective axles. Then, the folded up tire step unit 62 can be lifted off of the wheeled caddy unit 64. In the caddy-only arrangement, the wheeled caddy unit 64 can be rolled on its wheels 65 by a person. This can be especially useful if the person is lying down on a conventional creeper device, and the wheeled caddy unit 64 can be used for holding tools and fasteners while the person, the conventional creeper, and the wheeled caddy unit 64 are located under a motor vehicle.

When the and wheeled caddy apparatus 10 is employed in the seating arrangement, the seated person's comfort can be increased by using the cushion member 88. The cushion member 88 can be attached to the third step portion 44 by attaching the first hook or loop connectors 61 on the cushion member 88 to the complimentary second hook or loop connectors 63 on the third step portion 44. On the other hand, when the folded up tire step unit 62 is to be removed from the wheeled caddy unit 64, is to be unfolded, and is to be used as a tire step apparatus on a vehicle tire such as explained in the above-mentioned prior co-pending patent application Ser. No. 09/656,410, filed Sep. 6, 2000, then the cushion member 88 is separated from the folded up tire step unit 62. That is, the first hook or loop connectors 61 are separated from the second hook or loop connectors 63. The first hook or loop connectors 61 and the second hook or loop connectors 63 can be made from well known VELCRO(™) material.

The components of the folded tire step and wheeled caddy apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved folded tire step and wheeled caddy apparatus that is low in cost, relatively simple in design and operation, and which may advantageously be used by a person to sit upon to carry out vehicle maintenance activities. With the invention, a folded tire step and wheeled caddy apparatus provides that the folded up tire step apparatus and the special wheeled caddy can be secured firmly together so that they do not separate from each other. With the invention, a folded tire step and wheeled caddy apparatus provides that the folded up tire step apparatus is not translated in a sideways manner with respect to the special wheeled caddy. With the invention, a folded tire step and wheeled caddy apparatus provides the wheeled caddy with drain holes. With the invention, a folded tire step and wheeled caddy apparatus provides connections between the folded up tire step portion and the special wheeled caddy portion which can be easily made and unmade. With the invention, a folded tire step and wheeled caddy apparatus provides a seat cushion as part of the seat. With the invention, a folded tire step and wheeled caddy apparatus provides that the seat cushion can be readily attached to or detached from the tire step apparatus.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A folded tire step and wheeled caddy apparatus, comprising:

a folded up tire step unit comprising:

a first step assembly which includes a first step portion and a pair of first struts extending upward from said first step portion, a second step assembly which includes a second step portion and a pair of end bracket members extending downward from said second step assembly, wherein each of said end bracket members includes a front bracket portion and a rear bracket portion, each of said end bracket members being sized and configured to straddle a top portion of a vehicle tire such that each said front bracket portion is adapted to engage a front of said tire and each said rear bracket portion is adapted to engage a rear of said tire, hinge members connecting said first struts and said front bracket portions wherein said first step assembly is adapted to be rotated relative to said second step assembly between a first use position and a second storage position such that said first step portion comes to rest substantially co-extensively on said second step portion in said second storage position; and a wheeled caddy unit which includes tire step unit supports adapted for engagement with said end bracket members whereby to removably support said tire step unit in said second storage position on said caddy with said first step portion facing upwardly with respect to said caddy.

2. The apparatus of claim 1 wherein:

said folded up tire step unit includes bottom ends of said front bracket portion and bottom ends of said rear bracket portion, and said wheeled caddy unit includes a caddy floor portion, and said step unit supports include elevated platforms which extend upward from said caddy floor portion.

3. The apparatus of claim 2 wherein said caddy floor portion includes downwardly descending floor portions and a floor drain opening.

4. The apparatus of claim 2 wherein said wheeled caddy unit further includes translation prevention walls extending upward from peripheral regions of said caddy floor portion, adjacent to said tire step unit supports.

5. The apparatus of claim 2 wherein said wheeled caddy unit includes utility trays attached to side portions of said caddy floor portion.

6. The apparatus of claim 5 wherein said utility trays include tray drain openings.

7. The apparatus of claim 1 further including tire step unit connectors, each of said tire step unit connectors comprising:

an elastic strap connected to said caddy floor portion, and a hook connected to said elastic strap.

8. The apparatus of claim 1, further including:

a cushion member adapted to be removably attached to said facing upwardly first step portion of said folded up tire step unit.

9. The apparatus of claim 8 wherein said cushion member includes a quantity of first hook or loop connectors and said first step portion of said folded up tire step unit includes a quantity of second hook or loop connectors.

10. A folded tire step apparatus, comprising:

a first step assembly which includes a first step portion and a pair of first struts extending upward from said first step portion, a second step assembly which includes a second step portion and a pair of end bracket members extending downward from said second step assembly, wherein each of said end bracket members includes a front bracket portion and a rear bracket portion, each of said end bracket members being sized and configured to straddle a top portion of a vehicle tire such that each said front bracket portion is adapted to engage a front of said tire and each said rear bracket portion is adapted to engage a rear of said tire, hinge members connecting said first struts and said front bracket portions wherein said first step assembly is adapted to be rotated relative to said second step assembly between a first use position and a second storage position such that said first step portion comes to rest substantially co-extensively on said second step portion in said second storage position, said apparatus further including:

a cushion member adapted to be removably attached to said facing upwardly first step portion of said folded up tire step apparatus.

11. The apparatus of claim 10 wherein said cushion member includes a quantity of first hook or loop connectors and said first step portion of said folded up tire apparatus includes a quantity of second hook or loop connectors.

* * * * *